United States Patent
Borrello et al.

(10) Patent No.: US 11,970,157 B2
(45) Date of Patent: Apr. 30, 2024

(54) MOTOR-VEHICLE TRAJECTORY PLANNING AND CONTROL TO CAUSE AUTOMATED MOTOR-VEHICLES TO PERFORM LOW-SPEED MANOEUVRES IN AUTOMATED DRIVING

(71) Applicant: C.R.F. SOCIETA' CONSORTILE PER AZIONI, Orbassano (IT)

(72) Inventors: Giulio Borrello, Orbassano (IT); Enrico Raffone, Orbassano (IT); Claudio Rei, Orbassano (IT); Massimo Fossanetti, Orbassano (IT)

(73) Assignee: C.R.F. SOCIETA' CONSORTILE PER AZIONI, Orbassano (IT)

( * ) Notice: Subject to any disclaimer, the term of this patent is extended or adjusted under 35 U.S.C. 154(b) by 281 days.

(21) Appl. No.: 17/442,379

(22) PCT Filed: Oct. 23, 2020

(86) PCT No.: PCT/IB2020/059987
§ 371 (c)(1),
(2) Date: Sep. 23, 2021

(87) PCT Pub. No.: WO2021/079338
PCT Pub. Date: Apr. 29, 2021

(65) Prior Publication Data
US 2022/0169247 A1    Jun. 2, 2022

(30) Foreign Application Priority Data

Oct. 23, 2019  (EP) .................................... 19204949
Apr. 27, 2020  (IT) ........................ 102020000009100

(51) Int. Cl.
*B60W 30/06*    (2006.01)
*B60W 30/12*    (2020.01)
*B60W 60/00*    (2020.01)

(52) U.S. Cl.
CPC ............ *B60W 30/06* (2013.01); *B60W 30/12* (2013.01); *B60W 60/0011* (2020.02); *B60W 2520/105* (2013.01); *B60W 2520/14* (2013.01)

(58) Field of Classification Search
CPC .. B60W 30/06; B60W 60/0011; B60W 30/12; B60W 2520/105; B60W 2520/14
See application file for complete search history.

(56) References Cited

U.S. PATENT DOCUMENTS

| 10,589,739 | B2 * | 3/2020 | Kasaiezadeh Mahabadi ............. B60W 30/045 |
| 2018/0297587 | A1 * | 10/2018 | Kasaiezadeh Mahabadi ............. B60W 50/00 |
| 2020/0001920 | A1 * | 1/2020 | Hejase ............ B60W 30/18036 |

OTHER PUBLICATIONS

Oyama, Kentaro et al: "Model Predictive Parking Control for Nonholonomic Vehicles using Time-State Control Form", 2013 European Control Conference (ECC), EUCA, Jul. 17, 2013 (Jul. 17, 2013), pp. 458-465, Figs. 3-7. (Year: 2013).*

(Continued)

*Primary Examiner* — Khoi H Tran
*Assistant Examiner* — Aaron G Cain
(74) *Attorney, Agent, or Firm* — Harness, Dickey & Pierce, P.L.C.

(57) ABSTRACT

An automotive electronic dynamics control system for a motor-vehicle equipped with and automotive automated driving system designed to cause the motor-vehicle to perform low-speed manoeuvres in automated driving.
The automotive automated driving system comprises an automotive sensory system designed to detect motor-vehicle-related quantities, and automotive actuators comprising an Electric Power Steering, a Braking System, and a Powertrain.
The electronic dynamics control system is designed to implement a Driving Path Planner designed to:

(Continued)

receive data representative of static obstacles in the surroundings of the motor-vehicle and representing static space constraints to the motion of the motor-vehicle, and compute, based on the received data, a planned driving path for the motor-vehicle during a low-speed manoeuvre performed in automated driving.

The electronic dynamics control system is further designed to implement a Model Predictive Control (MPC)-based Trajectory Planner and Controller designed to:

receive from the Driving Path Planner data representative of the planned driving path and from the automotive sensory system data representative of positions and orientations of the motor-vehicle and of dynamic obstacles in the surroundings of the motor-vehicle and representing dynamic space constraints to the motion of the motor-vehicle, and compute, based on the received data, a planned lateral trajectory and a planned longitudinal trajectory for the motor-vehicle during the low-speed manoeuvre performed in automated driving.

The electronic dynamics control system is further designed to implement a Motion Controller designed to:

receive from the Trajectory Planner and Controller data representative of the planned lateral and longitudinal trajectories, and compute commands for the Electric Power Steering based on the planned lateral trajectory, and for the Braking System and the Powertrain based on the planned longitudinal trajectory.

The Driving Path Planner is designed to compute the planned driving path as a planned driving corridor within which the motor-vehicle may be driven and made up of a series of driving path segments each with a length and an orientation referenced in an inertial reference frame.

The MPC-based Trajectory Planner and Controller comprises:

an MPC-based Lateral Trajectory Planner and Controller designed to compute the planned lateral trajectory as a series of steering requests referenced in a motor-vehicle reference frame; and an MPC-based Longitudinal Trajectory Planner and Controller designed to compute the planned longitudinal trajectory as a series of longitudinal acceleration requests.

The Lateral Trajectory Planner and Controller is further designed to compute the planned lateral trajectory based on a linearized Lateral Trajectory Model which exhibits a singularity whenever the relative orientation of a couple of successive driving path segments of the planned driving path is equal to or higher than a given amount.

The Lateral Trajectory Planner and Controller is further designed to dynamically modify relative orientation of the motor-vehicle reference frame with respect to the inertial reference frame along the planned driving path so as to result in the relative orientations of all of the couples of successive driving path segments of the planned driving path being lower than the given amount.

7 Claims, 13 Drawing Sheets

(56) References Cited

OTHER PUBLICATIONS

Oyama, Kentaro et al: "Model Predictive Parking Control for Nonholonomic Vehicles using Time-State Control Form", 2013 European Control Conference (ECC), EUCA, Jul. 17, 2013 (Jul. 17, 2013), pp. 458-465, XP032526365, [retrieved on Nov. 17, 2013], pp. 458-463; figures 3-7.

Soloperto, Raffaele et al: "Collision avoidance for uncertain nonlinear systems with moving obstacles using robust Model Predictive Control", 2019 18th European Control Conference (ECC), EUCA, Jun. 25, 2019 (Jun. 25, 2019), pp. 811-817, XP033595607, DOI: 10.23919/ECC.2019.8796049 [retrieved on Aug. 12, 2019], pp. 813, 816.

Keenan Burnett et al: "Zeus: A System Description of the Two-Time Winner of the Collegiate SAE AutoDrive Competition", arxiv.org, Cornell University Library, 201 Olin Library Cornell University Ithaca, NY 14853, Apr. 19, 2020 (Apr. 19, 2020), XP081647872, p. 32; figure 22.

Polack et al., *The Kinematic Bicycle Model: a Consistent Model for Planning Feasible Trajectories for Autonomous Vehicles*, IEEE Intelligent Vehicles Symposium (IV), 2017.

Kong et al., *Kinematic and dynamic vehicle models for autonomous driving control design*, in 2015 IEEE Intelligent Vehicles Symposium 2015, pp. 1094-1099.

Kiyota H. et al., *A control of a class of nonholonomic systems with drift using time-state control form*, IFAC Nonlinear Control Systems Design, Enschede, The Netherlands, 757-762 (1998).

Raffone E., (2016) *A Reduced Order Steering State Observer for Automated Steering Control Functions*, Proceedings of the 13th Int. Conf. on Informatics in Control, Automation and Robotics, Lisbon, Portugal.

International Search Report and Written Opinion of the ISA issued in PCT/IB2020/059987, dated Jan. 12, 2021; ISA/EP.

Search Report of the Italian Patent and Trademark Office issued in IT102020000009100, dated Nov. 27, 2020.

\* cited by examiner

MOTOR-VEHICLE TRAJECTORY PLANNING AND CONTROL TO CAUSE AUTOMATED MOTOR-VEHICLES TO PERFORM LOW-SPEED MANOEUVRES IN AUTOMATED DRIVING

CROSS-REFERENCE TO RELATED APPLICATIONS

This patent application is a U.S. National Phase Application under 35 U.S.C. 371 of International Application No. PCT/IB2020/059987, filed on Oct. 23, 2020, which claims priority to European patent application No. 19204949.2 filed on Oct. 23, 2019 and to Italian patent application No. 102020000009100 filed on Apr. 27, 2020. The entire disclosures of the above-identified applications are incorporated herein by reference.

TECHNICAL FIELD OF THE INVENTION

The present invention relates to motor-vehicle trajectory planning and control to cause automated motor-vehicles to perform low-speed manoeuvres in automated driving.

The invention finds application in any type of road motor-vehicles, regardless of whether it is used for the transportation of people, such as a car, a bus, a camper, etc., or for the transportation of goods, such as an industrial vehicle (truck, B-train, trailer truck, etc.) or a light or medium-heavy commercial vehicle (light van, van, pick-up trucks, etc.).

STATE OF THE ART

As is known, automated driving is one of the most challenging research fields in today's automotive industry, because the automated driving is expected to contribute to the quality road transportation under different aspects. Despite the fact that the improvements of active and passive safety equipment enabled to reduce the number of road accidents significantly in the last decades, still many accidents happen every day mainly due to human failure. Therefore, vehicle automated driving could further increase the safety level of transportation.

Another important social expectation is the simultaneous increase of fuel consumption efficiency and decrease of pollution, which may also be enabled by the rise of automation. One of the most important topic in the autonomous driving field is trajectory planning, which represents the motor-vehicle motion references design.

In this patent application, the term "trajectory" will be used to indicate the state of a motor-vehicle, defined as the set of temporal trends as position, orientation, and speed, which define the desired states of the motor-vehicle motion, over a period of time, to distinguish it from the term "path", which is generally used to indicate a sequence of positions of a motor-vehicle, without worrying about speed or higher-order terms.

A huge number of different motor-vehicle trajectory planning approaches have been proposed, which can be approximately classified into three macro-categories: heuristic-based methods, geometric-based methods, and methods based on optimal control techniques.

Heuristic-based approaches usually apply artificial intelligence techniques, such as machine learning methods, search-based methods and random sampling methods.

Geometric-based methods are suitable mainly for low speed applications such as automated parking but, at higher speeds, these can't consider the dynamic behaviour of motor-vehicle and therefore its stability. Most of the geometric-based and heuristic-based methods generate paths instead of trajectories. To obtain a trajectory, some speed profile could be used to convert the computed path into a trajectory.

Optimal control-based methods, use optimal control techniques such as MPC (Model Predictive Control) and NLP (Non-Linear Programming) in order to generate the trajectory. Optimization techniques are used to find the appropriate control input sequence, i.e., steering wheel angle and motor-vehicle longitudinal acceleration, that drives the motor-vehicle to the desired end-point. The behaviour of the system in term of system states to the given sequence of control actions is computed by a model-based prediction. These methods enable the direct definition of trajectories instead of paths.

SUBJECT-MATTER AND SUMMARY OF THE INVENTION

The aim of the present invention is to provide an MPC-based motor-vehicle trajectory planning and control that is able to generate a dynamically feasible, comfortable, and customizable trajectory that allows motor-vehicles to perform low-speed manoeuvres in automated driving.

According to the present invention, an automotive electronic dynamics control system for an automated motor-vehicle is provided, as claimed in the appended claims.

DETAILED DESCRIPTION OF PREFERRED EMBODIMENTS OF THE INVENTION

The present invention will now be described in detail with reference to the attached figures to allow a person skilled in the art to make and use it. Various modifications to the described embodiments will be immediately apparent to the persons skilled in the art and the generic principles described can be applied to other embodiments and applications without departing from the protective scope of the present invention, as defined in the attached claims. Therefore, the present invention should not be considered limited to the described and illustrated embodiments, but it must be accorded the widest protective scope in accordance with the described and claimed characteristics.

Where not defined otherwise, all the technical and scientific terms used herein have the same meaning commonly used by persons skilled in the art pertaining to the present invention. In the event of a conflict, this description, including the definitions provided, will be binding. Furthermore, the examples are provided for illustrative purposes only and as such should not be considered limiting.

In particular, the block diagrams included in the attached figures and described below are not intended as a representation of structural characteristics or constructive limitations, but must be interpreted as a representation of functional characteristics, i.e. intrinsic properties of the devices and defined by the obtained effects or functional limitations, which can be implemented in different ways so as to protect their functionalities (operating abilities).

In order to facilitate the understanding of the embodiments described herein, reference will be made to some specific embodiments and a specific language will be used to describe the same. The terminology used in the present document has the purpose of describing only particular embodiments, and is not intended to limit the scope of the present invention.

Figure 1:
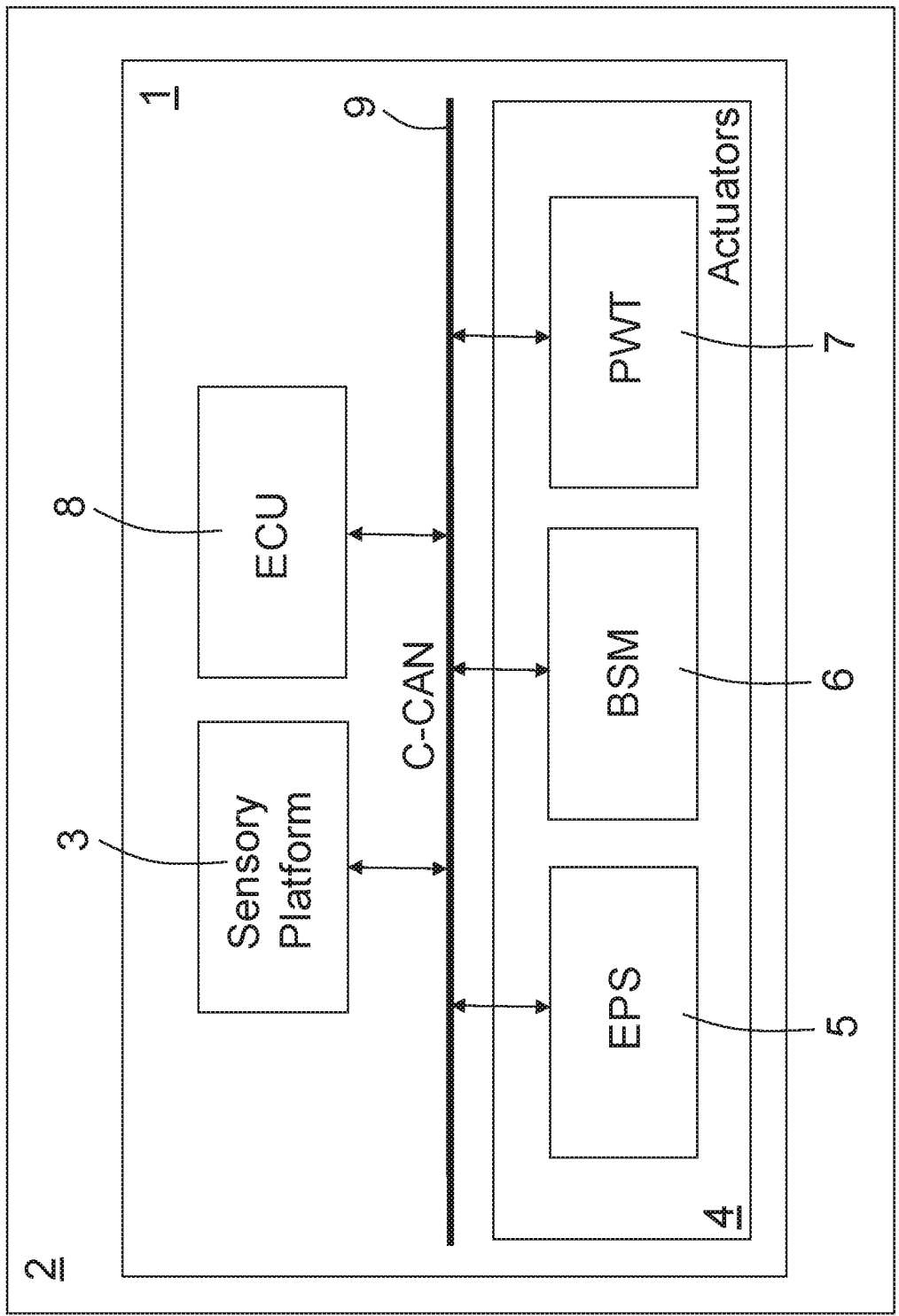
FIG. 1 shows a block diagram of an automotive automated driving system to perform low-speed manoeuvres.

FIG. 1 shows a block diagram of an automotive electronic automated driving system 1 of a motor-vehicle 2 and designed to cause the motor-vehicle 2 to perform low-speed manoeuvres in automated driving.

As shown in FIG. 1, the automated driving system 1 comprises:
- automotive systems, of which only those involved in the implementation of the present invention will be described below, and comprising, inter alia, an automotive sensory system or platform 3 designed to detect motor-vehicle-related quantities comprising, by way of example, wheel angle, steering wheel angle, yaw rate, longitudinal and lateral acceleration, position, etc., and automotive actuators 4 comprising, inter alia, Electric Power Steering (EPS) 5, Braking System Module (BSM) 6, and PoWerTrain (PWT) 7; and
- an automotive electronic control unit (ECU) 8 designed to communicate, via an automotive on-board communication network 9, such as a high-speed CAN, also known as C-CAN, FlexRAy or others, with the automotive sensory platform 3 and the automotive actuators 4, directly or indirectly, i.e., via dedicated automotive electronic control units, and to store and execute an automated driving software comprising software instructions which, when executed, cause the ECU 8 to become configured to communicate and cooperate with the with the automotive sensory platform 3 and the automotive actuators 4 to cause the motor-vehicle 2 to perform low-speed manoeuvres in automated driving.

Figure 2:
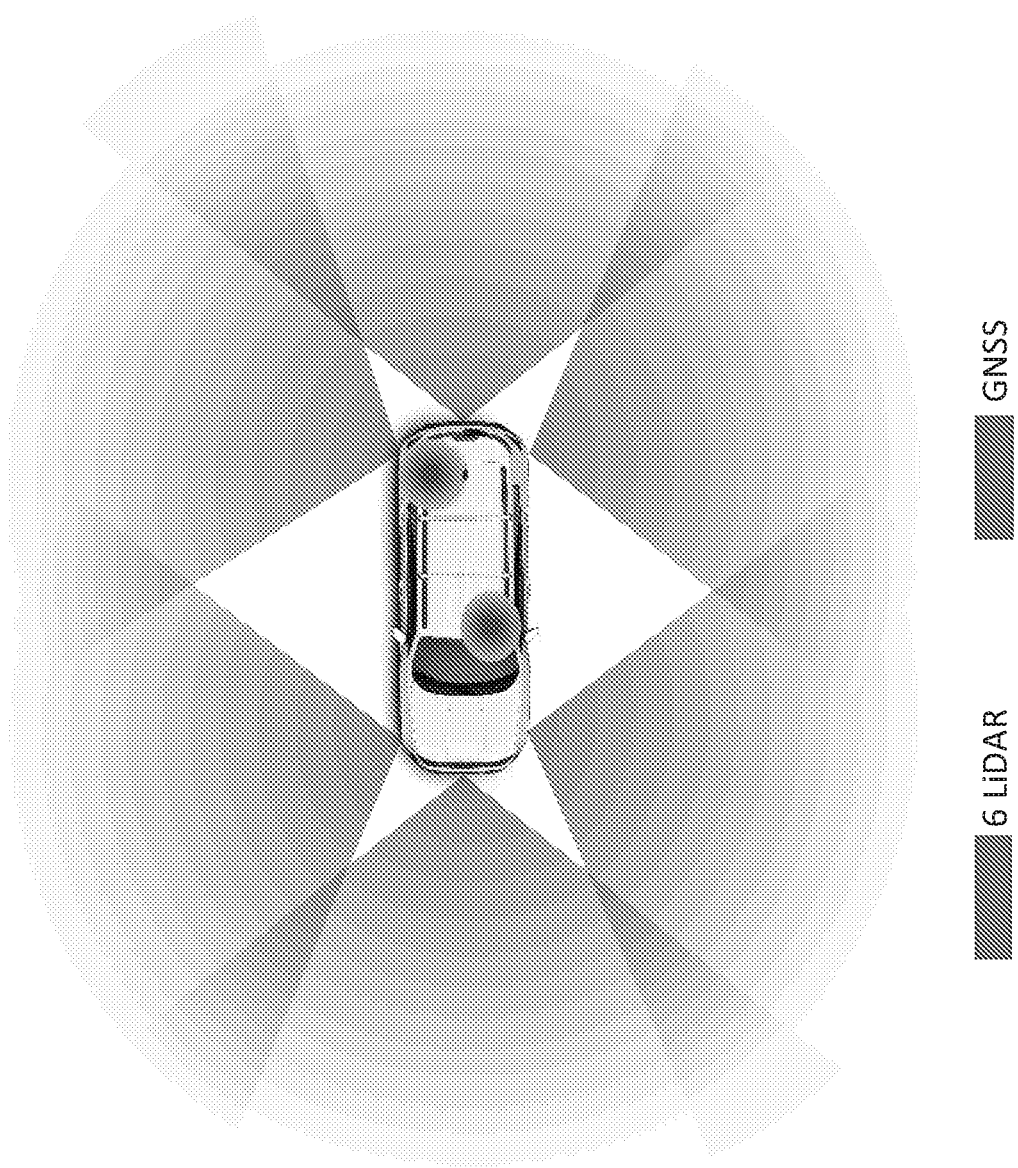
FIG. 2 shows an automotive sensory platform of the an automotive automated driving system.

The automotive sensory platform 3, an exemplary embodiment of which is shown in FIG. 2, may comprise traditional normal production ESC inertial Active Chassis sensors comprising longitudinal and lateral acceleration sensors, yaw rate sensors, and environment sensors including a (dual antenna) GNSS receiver, one or different forward-looking stereo cameras, a normal production forward-looking camera, one or different lidar sensors, one or more radar sensors, and a number of ultrasonic sensors.

EPS 5 comprises an electric motor operatively coupled to either a steering gear or a steering column and electrically controlled by the ECU 8 based on angular position and torque of the steering column sensed by the automotive sensory system or platform 3 to apply assistive steering torque and, resultingly, provide different amounts of assistance depending on driving conditions. A normal production EPS driven by a traditional Park Assist HWTO (Hand Wheel Torque Overlay) interface on the C-CAN 6 has been modified in terms of maximum motor-vehicle speed to result in the EPS providing not only assistance to the motor-vehicle driver but also a mechatronic unit to steer the motor-vehicle.

BSM 6 represents a functional interface to realize acceleration and deceleration actions on the motor-vehicle 2. The ECU 8 provides on the C-CAN 9 a functional channel able to be a gateway of acceleration/positive torque to the powertrain ECU (ECM) and the way to decelerate the motor-vehicle 2 by brakes. The normal production parking longitudinal interface has been modified in order to achieve technical targets of present invention. Also Dual Dry Clutch Transmission (DDCT) ECU software has been modified in order to manage the longitudinal manoeuvres from/to 0/15 km/h around to 0 Nm of engine torque in a comfortable way.

Motor-Vehicle Model

The Applicant has experienced that well-known dynamic models currently used for Trajectory Planning and Control for low-speed manoeuvres are undefined or ill-conditioned at low speeds. As shown to be effective in Polack et al., *The Kinematic Bicycle Model: a Consistent Model for Planning Feasible Trajectories for Autonomous Vehicles*, IEEE Intelligent Vehicles Symposium (IV), 2017, and Kong et al. *Kinematic and dynamic vehicle models for autonomous driving control design*, in 2015 IEEE Intelligent Vehicles Symposium 2015, pp. 1094-1099, the model used for low speed applications (0÷20 km/h) is the kinematic bicycle model.

Lateral Motor-Vehicle Model

Figure 3:
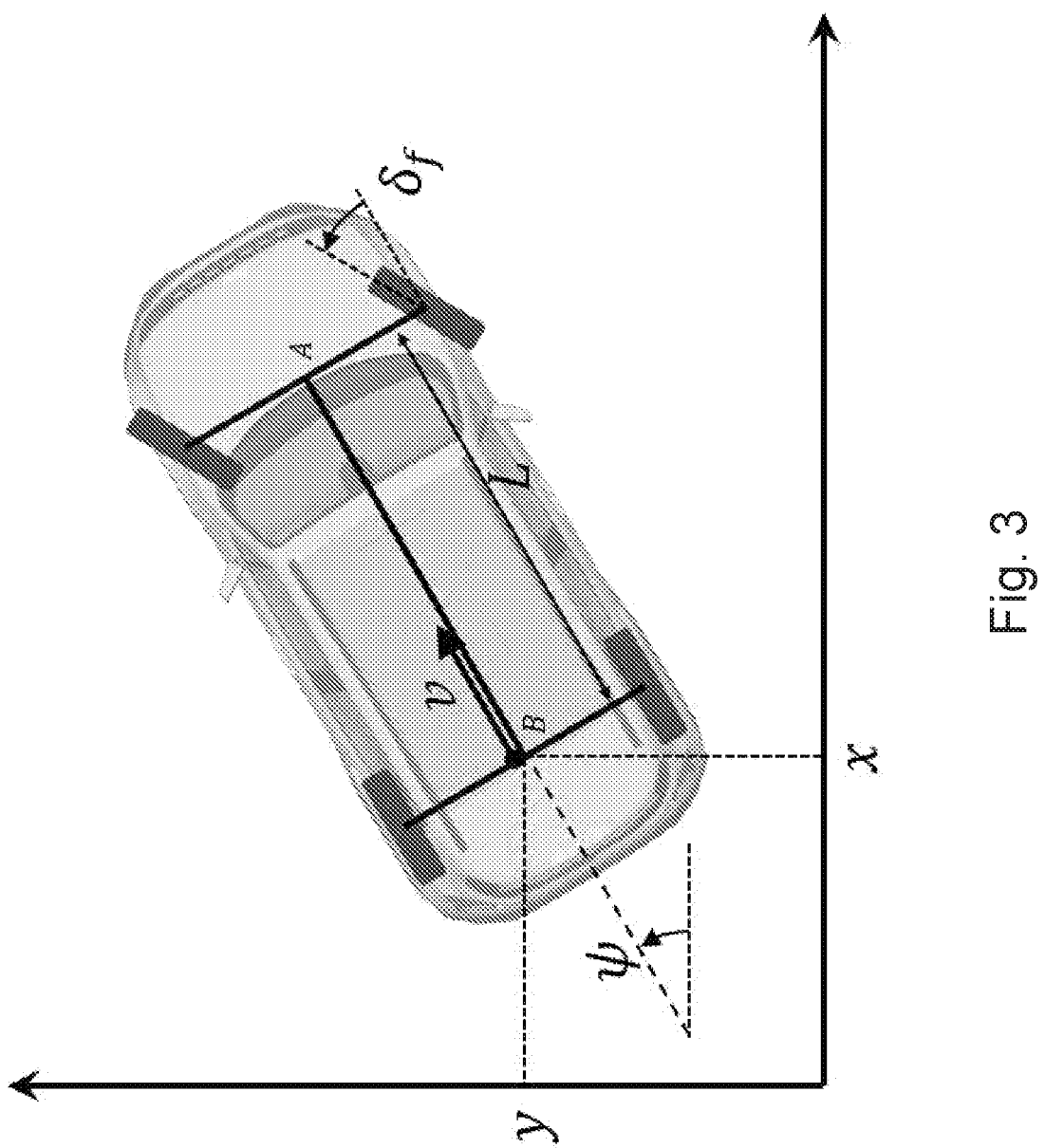
FIG. 3 shows inertial and motor-vehicle reference frames for lateral control.

With regard to the lateral motor-vehicle model, the 4-DoF (Degree of Freedom) kinematic bicycle model is one of the simplest models used in motion planning. FIG. 3 shows the inertial and motor-vehicle reference frames for lateral control, in which the two left and right front wheels are represented by one single wheel at point A and the rear wheels are represented by one central rear wheel at point B.

The steering angles of the front and rear wheels are represented by $\delta_f$ and $\delta_r$, respectively. The model is derived assuming that only the front wheel can be steered ($\delta_r = 0$). For that reason and simplicity, notation $\delta = \delta_f$ will be used.

The resulting kinematic bicycle model may be described by the following state-space equations in the inertial reference frame:

$$\dot{x} = v\cos(\psi) \qquad (1)$$

$$\dot{y} = v\sin(\psi) \qquad (2)$$

$$\dot{\psi} = \frac{v}{L}\tan\delta \qquad (3)$$

$$\dot{v} = a \qquad (4)$$

In particular, x and y are the Cartesian coordinates of the motor-vehicle's rear wheel, while ψr describes the orientation (yaw angle) of the motor-vehicle, v and a denote the velocity and longitudinal acceleration, respectively. Thus, the state and input vectors of this model can be defined as X=[x,y,ψ,v] and U=[δ,a], respectively.

The described kinematic model is nonlinear, so, as described by Oyama K. et al., *Model predictive parking control for non-holonomic vehicles using time-state control form*, in 2013 European Control Conference, 458-465, a time-state control form described by Kiyota H. et al., *A control of a class of nonholonomic systems with drift using time-state control form*, IFAC Nonlinear Control Systems Design, Enschede, The Netherlands, 757-762 (1998), may be used. This approach results in the lateral dynamics being linearized and representable as a differential equation w.r.t. the state (x) instead of time.

Dividing equations (2) and (3) by (1), a time-state control form is obtained:

$$\frac{dy}{dx} = \tan(\psi) \qquad (5)$$

$$\frac{d\psi}{dx} = \frac{\tan(\delta)}{L\cos(\psi)}$$

Introducing the non-linear state and input transformation:

$$\begin{bmatrix} z_1 \\ z_2 \\ z_3 \end{bmatrix} = \begin{bmatrix} x \\ y \\ dy/dx \end{bmatrix} = \begin{bmatrix} x \\ y \\ \tan(\psi) \end{bmatrix} \qquad (6)$$

$$\mu_1 = v\cos(\psi) \qquad (7)$$

$$\mu_2 = \frac{\tan(\delta)}{L\cos^3(\psi)} \qquad (8)$$

and applying the transformation to equation (5), two linear subsystems are obtained:

$$\frac{dz_1}{dt} = \mu_1 \qquad (9)$$

$$\frac{dt}{dz_1}\begin{bmatrix} \frac{dz_2}{dt} \\ \frac{dz_3}{dt} \end{bmatrix} = \begin{bmatrix} 0 & 1 \\ 0 & 0 \end{bmatrix}\begin{bmatrix} z_2 \\ z_3 \end{bmatrix} + \begin{bmatrix} 0 \\ 1 \end{bmatrix}\mu_2 \qquad (10)$$

in which the first one is a differential equation w.r.t. time, while the second one depends on the time-state x.

The actual steering angle δ is computed using $\mu_2$ and ψ inverting equation (8):

$$\delta = \tan^{-1}(L\cos^3(\psi)\mu_2) \qquad (11)$$

Longitudinal Motor-Vehicle Model

With regard to the longitudinal motor-vehicle model, in general, the point-mass model is not used for design lateral controllers due to their large modelling errors. However, those models are widely used for longitudinal control purposes and the motor-vehicle's longitudinal motion is described, in the motor-vehicle reference frame, as a double integrator system:

$$\dot{\xi} = v \qquad (12)$$

$$\dot{v} = a \qquad (13)$$

Control Design

Figure 4:
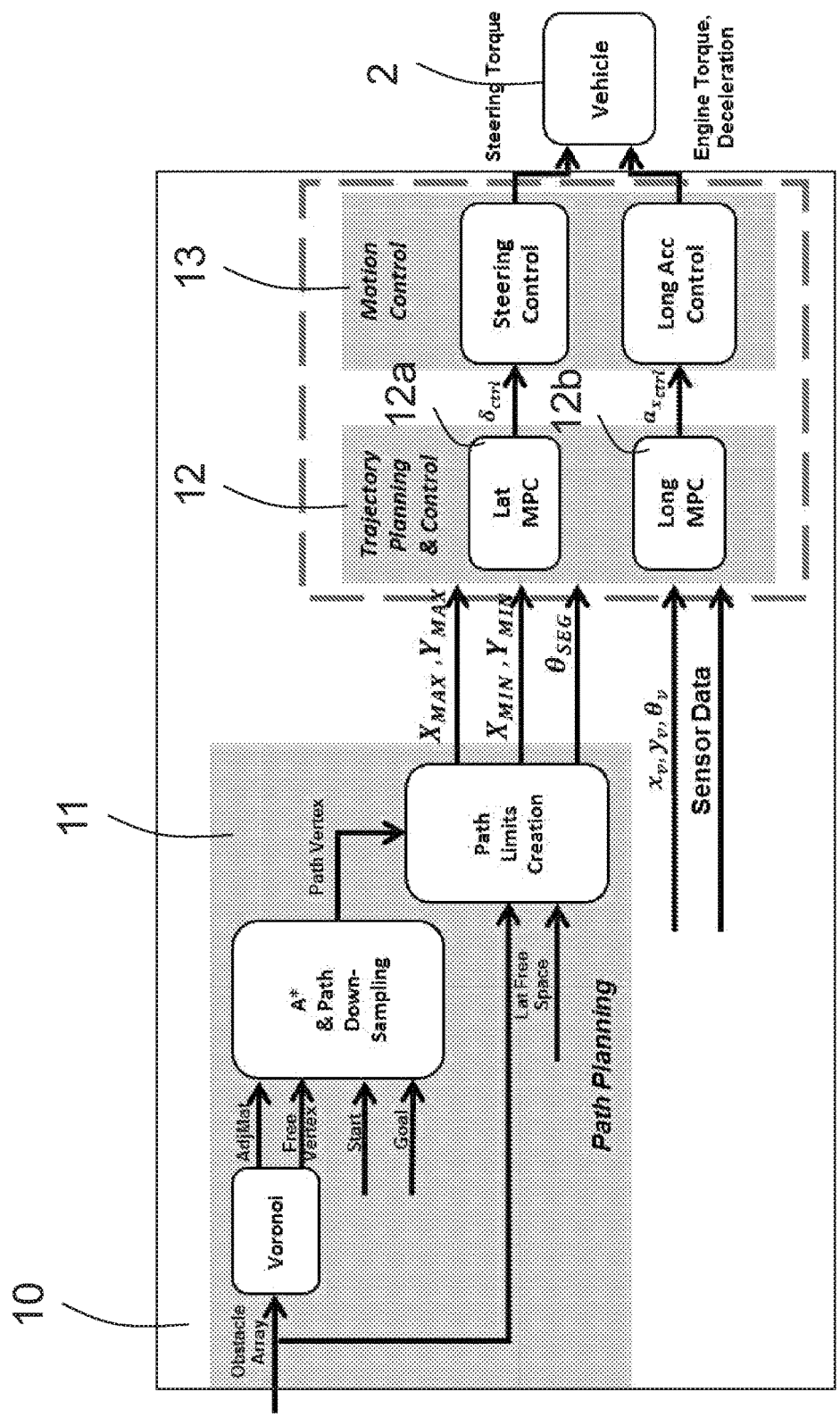
FIG. 4 shows a general block diagram of trajectory planning and control for low-speed manoeuvres.

FIG. 4 shows a general block diagram of a dynamics control system 10 designed to control lateral and longitudinal dynamics of the motor-vehicle 2 during performance of low-speed manoeuvres in automated driving.

The dynamics control system 10 may be entirely implemented by the ECU 8 or its implementation may be distributed among different ECUs, according to a proprietary logical architecture that the automotive manufacturer will decide to adopt.

For ease of description, in the following the dynamics control system 10 will be described to be entirely implemented by the ECU 8, without thereby this implying any loss of generality.

The dynamics control system 10 is designed to implement a Driving Path Planner 11 designed to receive data representative of static obstacles, such as roads, buildings, etc., in the surroundings of the motor-vehicle 2 and representing static space constraints to the motion of the motor-vehicle 2, and to compute a planned driving path for the motor-vehicle 2 during a low-speed manoeuvres performed in automated driving based on the positions of the static obstacles in the surroundings of the motor-vehicle 2 by implementing an algorithm fusion between techniques known in the literature, e.g., a Voronoi decomposition and A* path search algorithm.

In particular, the Driving Path Planner 11 is designed to compute the planned driving path as an obstacle-free driving corridor within which the motor-vehicle 2 may be driven and made up of a series of driving path segments each with a length and an orientation referenced in an inertial (or absolute) reference frame.

The dynamics control system 10 is further designed to implement a Model Predictive Control (MPC)-based Trajectory Planner and Controller 12 designed to receive from the Driving Path Planner 11 data representative of the planned driving path of the motor-vehicle 2 and to compute, based thereon, a planned lateral trajectory and a planned longitudinal trajectory of the motor-vehicle 2, as described in more detail in the following.

In particular, the MPC-based Trajectory Planner and Controller 12 comprises two distinct MPC-based Trajectory Planners and Controllers, a Lateral Trajectory Planner and Controller 12a designed to plan and control the Lateral dynamics, and a Longitudinal Trajectory Planner and Controller 12b designed to plan and control the Longitudinal dynamics.

The Lateral Trajectory Planner and Controller 12a is designed to compute the planned lateral trajectory as a series of steering requests δ along the planned driving path in a motor-vehicle reference frame, and the Longitudinal Trajectory Planner and Controller 12b is designed to compute the planned longitudinal trajectory as a series of longitudinal acceleration requests α of the motor-vehicle 2 along the planned driving path;

Model Predictive Control (MPC) has been developed considerably over the last two decades. The main advantage of the MPC is the fact that it allows the current timeslot to be optimized while taking future time-slots into account. This is achieved by optimizing a finite time-horizon, but only implementing the first time-slot.

MPC can manage future reference profiles and constraints and anticipate control actions accordingly. These limits may be imposed on any part of the system variables, such as states, outputs, inputs, and considering main actuators characteristics and operative limitations.

The dynamics control system 10 is further designed to implement a Motion Controller 13 designed to receive from the Trajectory Planner and Controller 12 data representative of the planned lateral a longitudinal trajectories and to compute appropriate commands for the automated driving system 1, as described in more detail in the following.

MPC-Based Lateral Trajectory Planner and Controller

From equation (10), in order to control $z_2$ and $z_3$ using μ2, the MPC-based Lateral Trajectory Planner and Controller 12a controls the motor-vehicle lateral dynamics to track the optimal path according to constraints on the steering limitation and obstacle-free driving corridor. Discretizing equation (10) by using Tustin method, it may be obtained:

$$\begin{bmatrix} z_2(k+1) \\ z_3(k+1) \end{bmatrix} = \begin{bmatrix} 1 & \Delta_s \\ 0 & 1 \end{bmatrix} \begin{bmatrix} z_2(k) \\ z_3(k) \end{bmatrix} + \begin{bmatrix} \Delta_s^2/2 \\ \Delta_s \end{bmatrix} \mu_2(k) \tag{13}$$

where $\Delta_s$ is the step w.r.t. the time-state x (positive or negative respectively for forward or backward motion), i.e., As is not a time step, but it's the delta distance of movement along x.

Denoting the state vector, $z=[z_2\ z_3]^T$, the control horizon, H, the weight diagonal positive definite matrices Q and R, the general performance index for path tracking control may be defined as:

$$J = z(H)^T Q_{fin} z(H) + \sum_{k=0}^{H-1} z(k)^T Q z(k) + R\mu_2(k)^2 \tag{14}$$

subject to the constraints:

$$z_{2_{min}}(z_1) \le z_2 \le z_{2_{max}}(z_1) \tag{15}$$

$$\delta_{min} \le \delta \le \delta_{max} \tag{16}$$

Considering from equation (11) the function:

$$\Gamma(z_3, \mu_2) = l\cos^3(\tan^{-1}(z_3))\mu_2 \tag{17}$$

equation (16) may be rewritten as follows:

$$\tan(\delta_{min}) \le \Gamma(z_3, \mu_2) \le \tan(\delta_{max}) \tag{18}$$

Since it is a nonlinear function of $z_3$, in order to solve the optimization through linear constraints, it is approximated with a first-order Taylor series expansion:

$$\hat{\Gamma}(z_3, \mu_2) = \Gamma(\hat{z}_3(k), \hat{\mu}_2(k)) + \frac{d\Gamma}{dz_3}(z_3 - \hat{z}_3(k)) + \frac{d\Gamma}{d\mu_2}(\mu_2 - \hat{\mu}_2(k)) \tag{19}$$

with:

$$\frac{d\Gamma}{dz_3} = -\frac{\sin(\tan^{-1}(z_3))3L\cos^3(\tan^{-1}(z_3))\mu_2}{1+\hat{z}_3^2(k)} \tag{20}$$

$$\frac{d\Gamma}{d\mu_2} = l\cos^3(\tan^{-1}(z_3)) \tag{21}$$

where $\hat{\mu}_2(k)$ is the input of previous sampling and $\hat{z}_3(k)$ is the predicted state using the input of previous sampling and initial current state. Hence, the constraint related to the steering angle may be approximated by:

$$\tan(\delta_{min}) \le \hat{\Gamma}(z_3, \mu_2) \le \tan(\delta_{max}) \tag{22}$$

Thus, the lateral MPC formulation may be rewritten as:

$$J(z_2, z_3) = \begin{bmatrix} y_{ref}(H_{lat}) - z_2(H_{lat}) \\ -z_3(H_{lat}) \end{bmatrix}^T Q_f \begin{bmatrix} y_{ref}(H_{lat}) - z_2(H_{lat}) \\ -z_3(H_{lat}) \end{bmatrix} + \\ + \sum_{k=1}^{H_{lat}-1} \begin{bmatrix} y_{ref}(k) - z_2(k) \\ -z_3(k) \end{bmatrix}^T Q \begin{bmatrix} y_{ref}(k) - z_2(k) \\ -z_3(k) \end{bmatrix} + \\ \sum_{k=0}^{H_{lat}-1} R\mu_2^2(k) \tag{23}$$

subject to the following constraints:

$$Y_{MIN} \le z_2(k) \le Y_{MAX} \tag{24}$$

$$\tan(\delta_{min}) \le \hat{\Gamma}(z_3, \mu_2) + \frac{d\Gamma}{dz_3}(z_3 - \hat{z}_3(k)) + \frac{d\Gamma}{d\mu_2}(\mu_2 - \hat{\mu}_2(k)) \le \tan(\delta_{max}) \tag{25}$$

The Applicant has noticed that main problems of this approach are the representation singularities introduced by the model outside the range π/2<ψ<π/2 and errors introduced by the linearization.

The present invention overcomes these problems by dynamically (and smoothly) modifying the relative orientation of the motor-vehicle reference frame and the inertial reference frame along the planned driving path, in particular by dynamically (and smoothly) rotating the motor-vehicle reference frame relative to the inertial reference frame, so as to prevent w from being higher than π/2.

Rotation of the motor-vehicle reference frame relative to the inertial reference frame amounts to a corresponding rotation of the planned driving path relative to inertial reference frame, so resulting in the planned driving path failing to exhibit bends greater than π/2.

These allow representation singularities to be avoided, whereby reducing linearization errors at each time step, and maximizing the length of the section of path usable by the MPC-based Lateral Trajectory Planner and Controller 12a. In this way, maximum flexibility of scenario coverage may be obtained.

In detail, after computing the planned driving path of the motor-vehicle 2 as a set of driving path segments, it is firstly identified in which driving path segment the motor-vehicle 2 is located and then the planned driving path is dynamically rotated using a linear interpolation of the orientation angles $\theta_i$ and $\theta_{i+1}$ of driving path actually driven along by the motor-vehicle 2 and of the first next driving path segment, and a weighting factor W computed based on the orientation angle $\theta_{i+2}$ of the second next driving path segment:

$$\theta_{ROT} = W \frac{(\theta_{i+2} - \theta_{i+1})d}{d_{i+1,i}} + \frac{(\theta_{i+1} - \theta_i)d}{d_{i+1,i}} + \theta_i \qquad (26)$$

$$d = \sqrt{(x_v - x_i)^2 + (y_v - y_i)^2}$$

$$d_{i+1,i} = \sqrt{(x_{i+1} - x_i)^2 + (y_{i+1} - y_i)^2}$$

where:

$(x_v, y_v)$ are the current motor-vehicle's coordinates in the inertial reference frame, d is the Euclidean distance between the current position of the motor-vehicle 2 and the end of the driving path segment containing the current position of the motor-vehicle 2, and $d_{i+1,i}$ is the length of the next driving path segment following the one containing the current position of the motor-vehicle.

MPC-Based Longitudinal Trajectory Planner and Controller

Like the MPC-based Lateral Trajectory Planner and Controller 12a, also for MPC-based Longitudinal Trajectory Planner and Controller 12b the control technique is the linear MPC. This allows speed reference and obstacle tracking to be managed in a single integrated approach.

To implement a control using the motor vehicle's longitudinal motion model, the aforementioned system (12, 13) may be discretised:

$$\begin{bmatrix} \xi(k+1) \\ v(k+1) \end{bmatrix} = \begin{bmatrix} 1 & \Delta_t \\ 0 & 1 \end{bmatrix} \begin{bmatrix} \xi(k) \\ v(k) \end{bmatrix} + \begin{bmatrix} \Delta_t^2/2 \\ \Delta_t \end{bmatrix} a(k) \qquad (27)$$

where $\xi$ is the longitudinal position of the motor-vehicle 2 from the start of the planned driving path, v is the longitudinal speed, and $\Delta_t$ is the time step between two computation time instants.

This formulation easily handles problems such as tracking of speed reference and maintenance of position constraints. However, this approach can't handle stationary error due to exogenous disturbances and/or motion control inaccuracy.

The present invention overcomes this problem by adding a position reference computed as the difference between the integral of the speed reference and $D_{Smeas}$, which is the travelled distance measured from longitudinal control enabled by the wheel speed sensors:

$$\xi_{ref} = \int V_{ref} dt - Ds_{meas} \qquad (28)$$

The performance index for speed tracking control can be written as:

$$J(\xi, v_v) = \begin{bmatrix} \xi_{ref}(H_{lon}) - \xi(H_{lon}) \\ V_{ref}(H_{lon}) - v(H_{lon}) \end{bmatrix}^T Q_f \begin{bmatrix} \xi_{ref}(H_{lon}) - \xi(H_{lon}) \\ V_{ref}(H_{lon}) - v(H_{lon}) \end{bmatrix} + + \qquad (29)$$

-continued
$$\sum_{k=1}^{H_{lon}-1} \begin{bmatrix} \xi_{ref}(k) - \xi(k) \\ V_{ref}(k) - v(k) \end{bmatrix}^T Q \begin{bmatrix} \xi_{ref}(k) - \xi(k) \\ V_{ref}(k) - v(k) \end{bmatrix} +$$

$$\sum_{k=0}^{H_{lon}-1} R a^2(k)$$

subject to the following constraints:

$$\xi_{MIN} \leq \xi(k) \leq \xi_{MAX} \qquad (30)$$

$$v_{MIN} \leq v_x(k) \leq v_{MAX} \qquad (31)$$

$$a_{MIN} \leq a_x(k) \leq a_{MAX} \qquad (32)$$

$$\frac{\partial}{\partial t} a_{MIN} \Delta_t \leq a(k) - a(K-1) \leq \frac{\partial}{\partial t} a_{MAX} \Delta_t \qquad (33)$$

About the speed reference, the general idea is:

to try to follow the maximum speed allowed along straight driving paths segments, and to reduce it taking into account:

the curvature p predicted by the Lateral Trajectory Planner and Controller 12a, and the maximum allowed lateral acceleration, $a_{ymax}$:

$$V_{ref} = \sqrt{\frac{a_{ymax}}{\rho}} \qquad (34)$$

where the curvature $\rho$ is computed as follows:

$$\rho = \frac{2\sin\left(\frac{\theta_i - \theta_{i+1}}{2}\right)}{\cos\left(\frac{\theta_i + \theta_{i+1}}{2}\right)} \qquad (35)$$

Motion Controller

The previously-described motor-vehicle models assume that the control inputs, i.e., the series of steering requests $\delta$ and the series of longitudinal acceleration requests $\alpha$, can be directly controlled. However, low level controllers are needed to transform this control inputs into physical signals for the actuators. In detail, the steering angle control is realized by using the EPS torque interface available on the CAN. Similarly, the motor-vehicle longitudinal motion is controlled by means of acceleration/deceleration requests to the braking system through normal production Adaptive Cruise Control interface.

Steering Control

The EPS low level control loop has been designed by using a state feedback controller comprising:

a linear time invariant Kalman observer that filters/estimates the system states, useful also to estimate driver hands on the steering wheel, and an optimal linear quadratic integral controller able to track the steering wheel angle reference from MPC-based Lateral Trajectory Planner and Controller 12a.

Further details about a model-based development and related practical considerations may be found in Raffone E. (2016) *A Reduced Order Steering State Observer for Automated Steering Control Functions*, Proceedings of the 13$^{th}$ Int. Conf. on Informatics in Control, Automation and Robotics, Lisbon, Portugal.

Longitudinal Acceleration Control

Conversely to the steering control, the longitudinal acceleration control is managed by multiple actuations (e.g., engine, electric motor, gear-box, and braking), hence the interfaces can change according to the motor-vehicle architecture, actuator controls, and their integration.

In this case, we face a motor-vehicle 2 in which the motor-vehicle interfaces, for longitudinal dynamic control, are:

engine-torque request: delivered to Engine Control ($T_{reqs}$)
deceleration request: delivered to Brakeing System ($a_{reqs}$)

Figure 5:
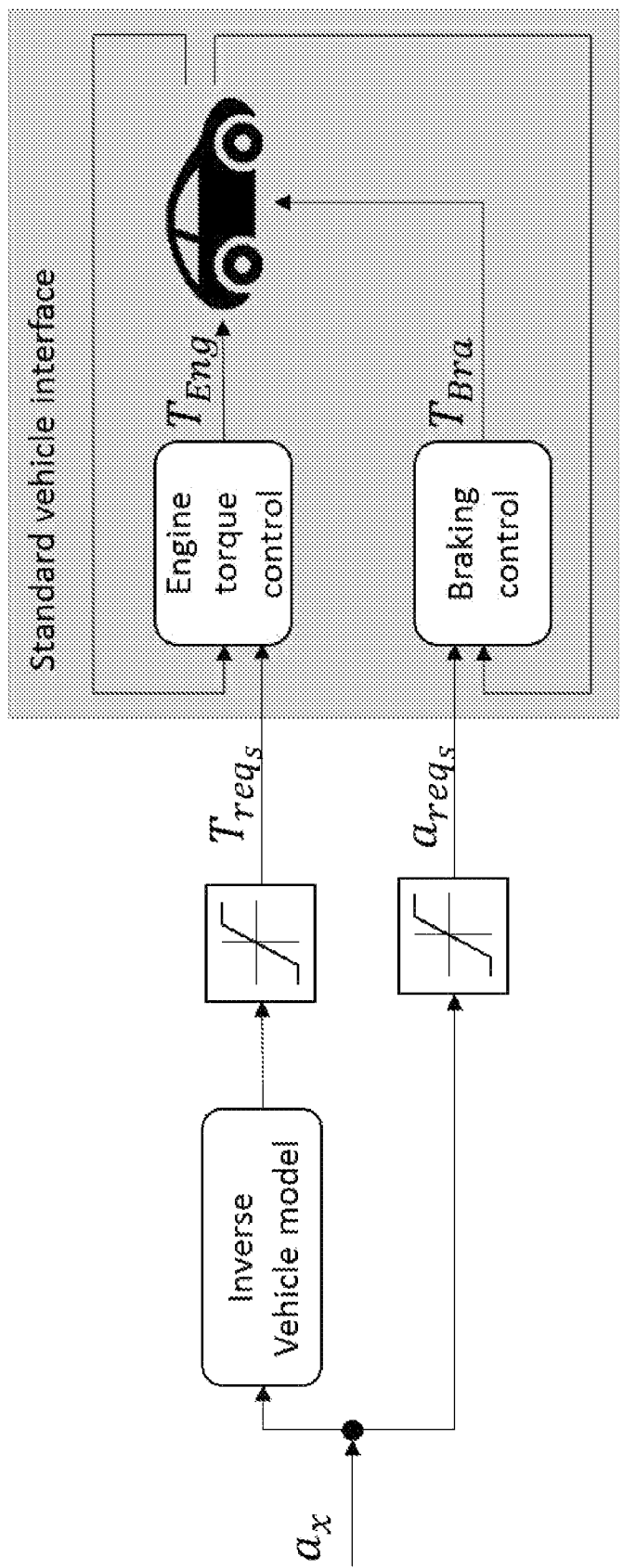
FIG. 5 shows a general block diagram of longitudinal control setup.

With the aim to keep the control architecture simply and easy to tune, no further feedback control loop is introduced at this level. Therefore, the longitudinal acceleration control is implemented by means of the structure shown in FIG. 5.

The command $a_x$ is split in two channels, one for each interface. The Braking System includes a deceleration closed loop that allows to accept directly deceleration command ($a_{reqs}$) and to generate a braking torque $T_{bra}$. The Engine Control performs a closed-loop control based on an estimation of applied engine torque $T_{Eng}$. To match the available interface it has been implemented an inverse vehicle model, to convert $a_x$ in $T_{reqs}$, which considers the current motor-vehicle configuration (e.g., gear ratio, inertia, friction) and mainly exogenous input (e.g. road slope, drag forces).

The relative equation can be written as follows:

$$T_{req} = m(a_x + g\sin(\alpha))R_w \tau_{gr} \tau_{ar} \eta_{ar} + (F_0 + v_x F_1 + v_x^2 F_2) \quad (36)$$

where m is the equivalent motor-vehicle mass, g is the gravity acceleration, a is the road slope, $R_w$ is the loaded wheel radius, $\tau_{gr}$ and $\tau_{ar}$ are respectively the gearbox and axle ratios, $\eta_{gr}$ and $\eta_{ar}$ are the mechanical efficiency of gearbox and transmission, and $F_0$, $F_1$, $F_2$ are the coast down coefficients.

SIMULATION AND EXPERIMENTAL RESULTS

Figure 6:
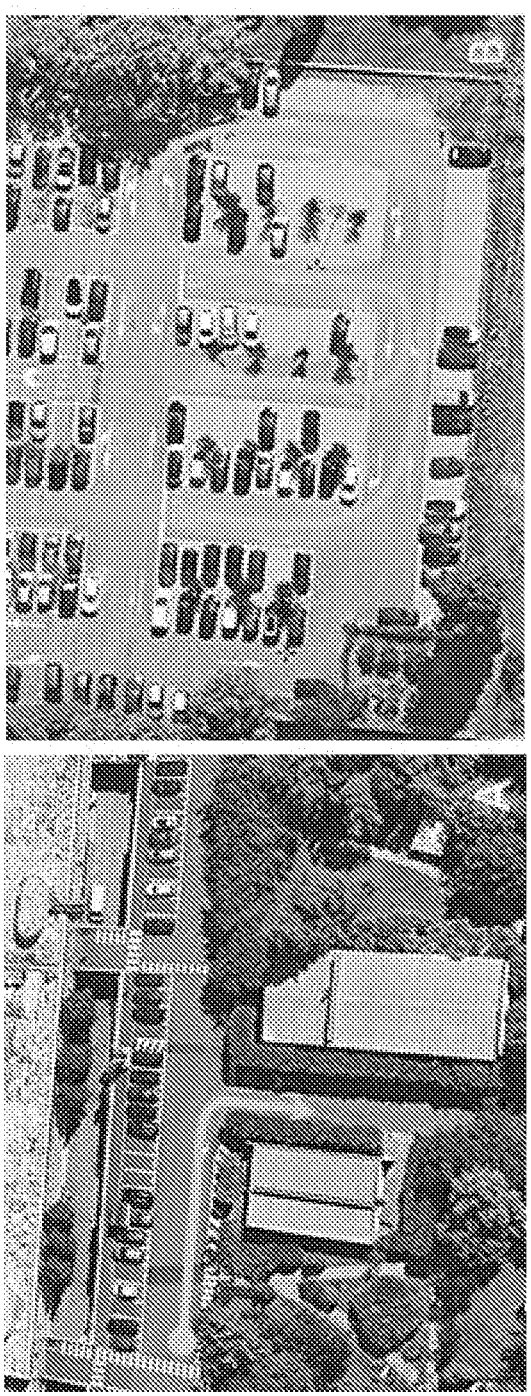
FIG. 6 shows two low-speed manoeuvres simulated in a virtual environment and physically performed on the road to test the performance of the present invention.

Performance of the present invention has been tested by simulating and experimenting on road the two low-speed manoeuvres shown in FIG. 6.

Simulations and tests have been made by setting:
the MPC of the Lateral Trajectory Planner and Controller 12a with a prediction horizon (Hlat) equal to 60 steps and step width ($\Delta$s) of 0.5 m, and
the MPC of the Longitudinal Trajectory Planner and Controller 12b with a prediction horizon (Hlong) equal to 40 steps and step width ($\Delta$t) of 100 ms.

The prediction step has been chosen to represent a quasi-infinite horizon for motor-vehicle kinematics optimization (about 30 meters or 4 seconds).

First Low-Speed Manoeuvre

Figure 7:
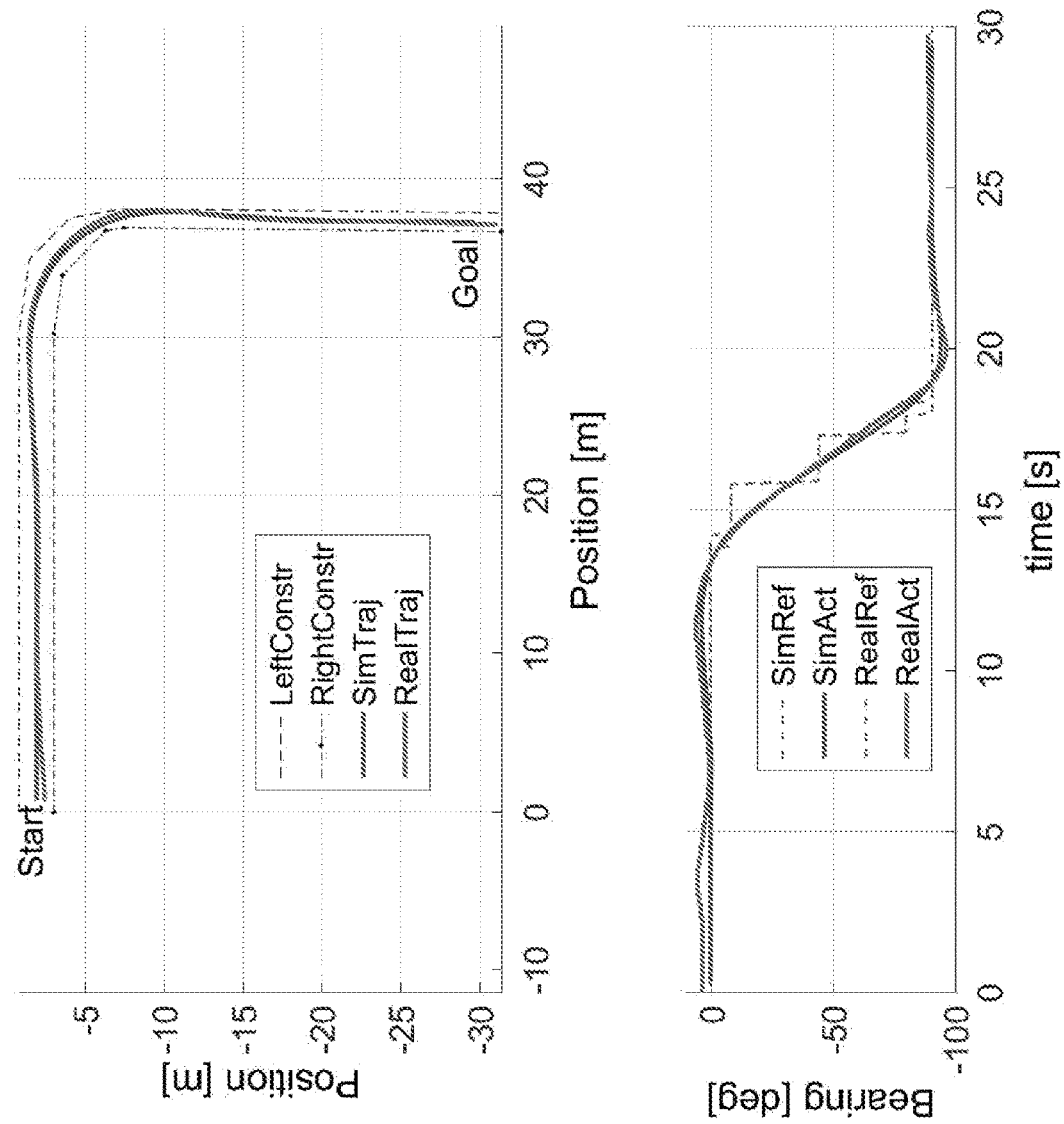
FIG. 7 comparatively shows motor-vehicle lateral states during a simulation and a test on road of a first low-speed manoeuvre.

The first low-speed manoeuvre is a curve, trying to maintain the half of the road lane and the motor-vehicle bearing parallel as much as possible to the actual driving path segment orientation (FIG. 7). The required longitudinal behaviour expects to track a reference vehicle speed of 10 km/h. The lateral controller is able to compute a smooth steering angle reference which satisfies the physical constraints according to equation (16) (FIG. 9). The lateral prediction is used to realize a deceleration profile proportional to the expected change of orientation (FIG. 8) to achieve a comfortable manoeuvre.

When the motor-vehicle has reached the goal, it was stopped at a longitudinal position constraint and the longitudinal controller was demanded to realize a comfortable stop manoeuvre.

FIG. 7 shows an interesting matching between simulation and test on the road, with only limited differences in terms of trajectory and motor-vehicle orientation. The same matching may also be appreciated in FIG. 8, mainly in the travelled distance: significant differences between simulation and test are about motor-vehicle speed, due to the fact that the implemented motor-vehicle model was not so detailed in terms of powertrain hysteresis and non-linearities.

Second Low-Speed Manoeuvre

The second low-speed manoeuvre is more challenging than the first one and consisted in an automated valet parking search manoeuvre, with narrow spaces and two consecutive u-curves.

Figure 8:
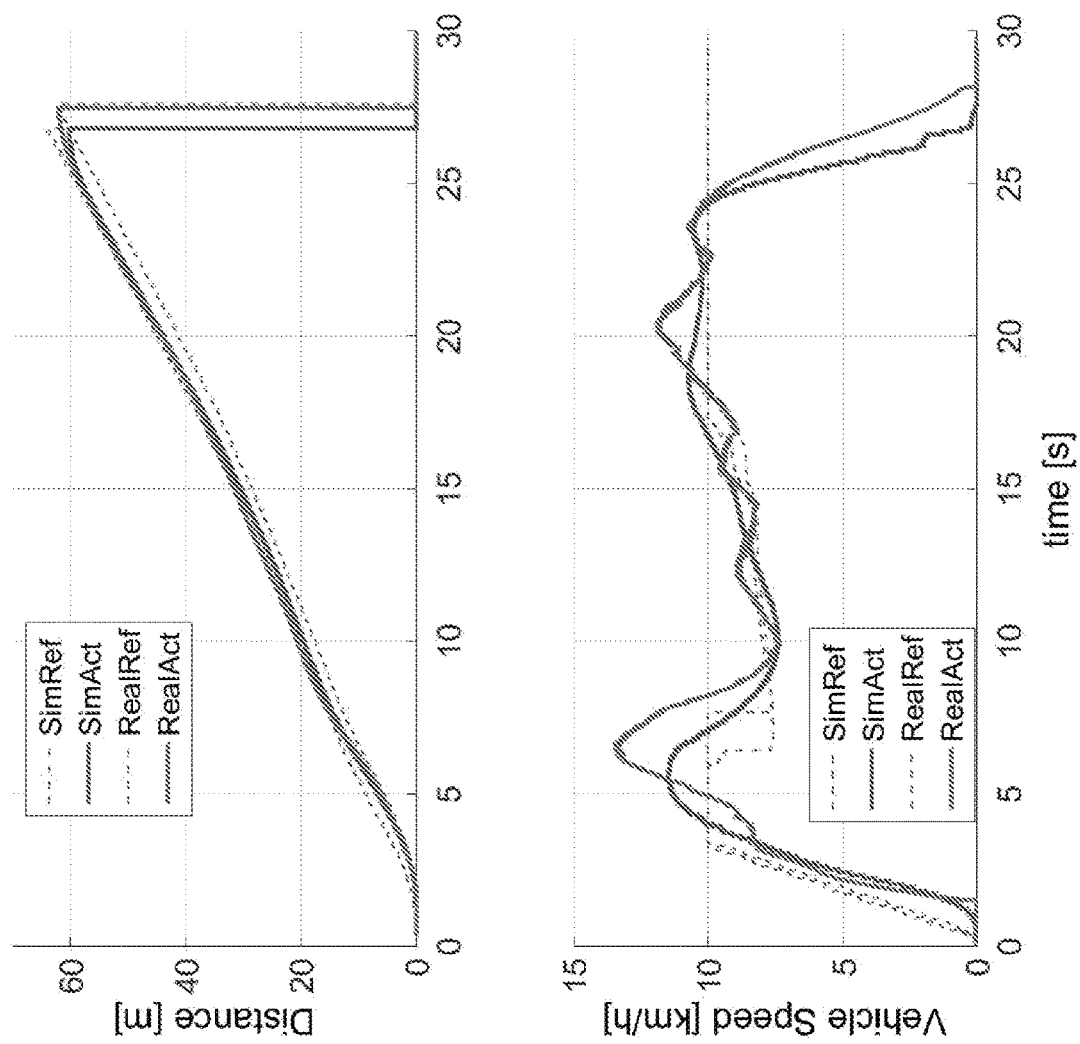
FIG. 8 comparatively shows motor-vehicle longitudinal states during a simulation and a test on road of the first low-speed manoeuvre.
Figure 9:
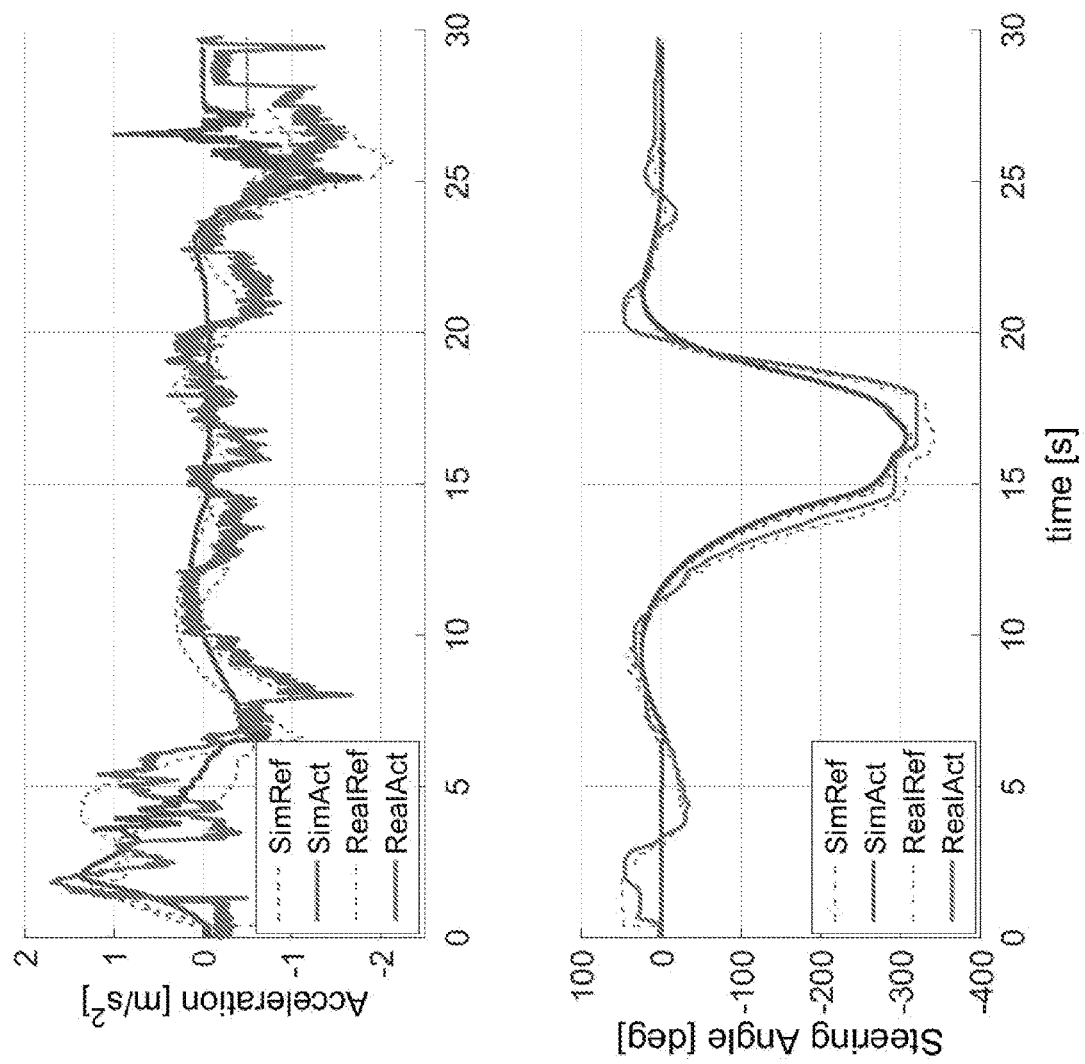
FIG. 9 comparatively shows reference and actuated control inputs during a simulation and a test on road of the first low-speed manoeuvre.
Figure 10:
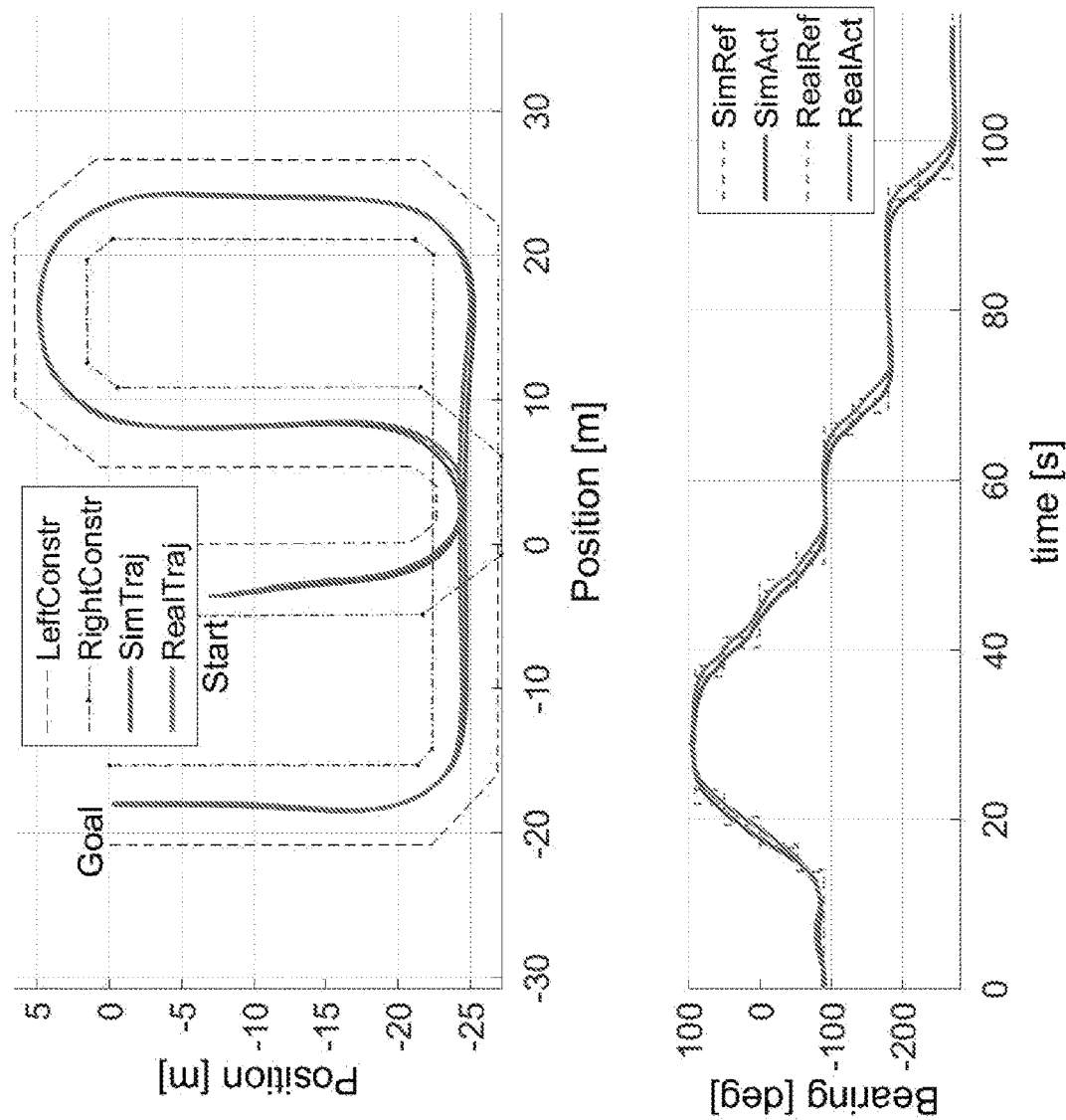
FIG. 10 comparatively shows motor-vehicle lateral states during a simulation and a test on road of a second low-speed manoeuvre.
Figure 11:
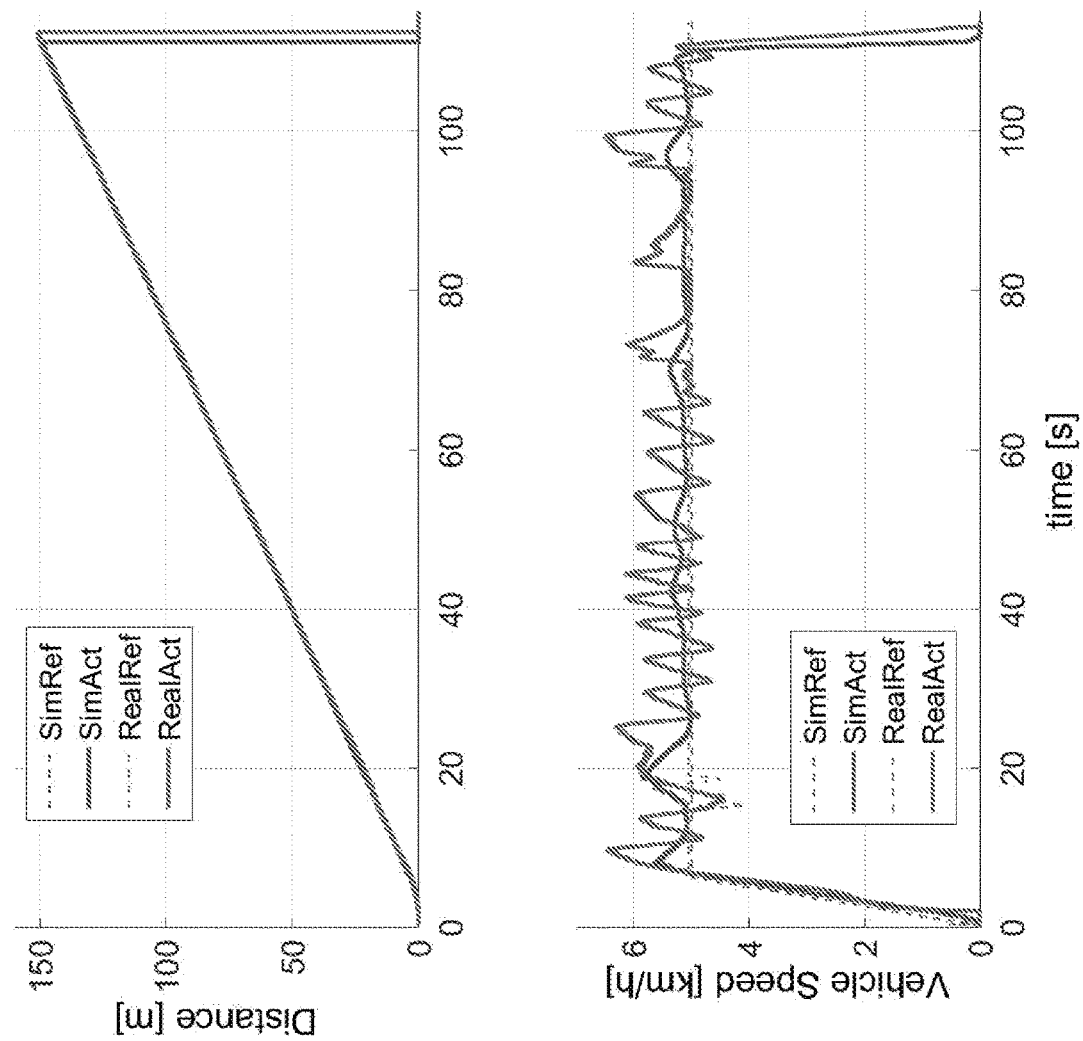
FIG. 11 comparatively shows motor-vehicle longitudinal states during a simulation and a test on road of a second low-speed manoeuvre.
Figure 12:
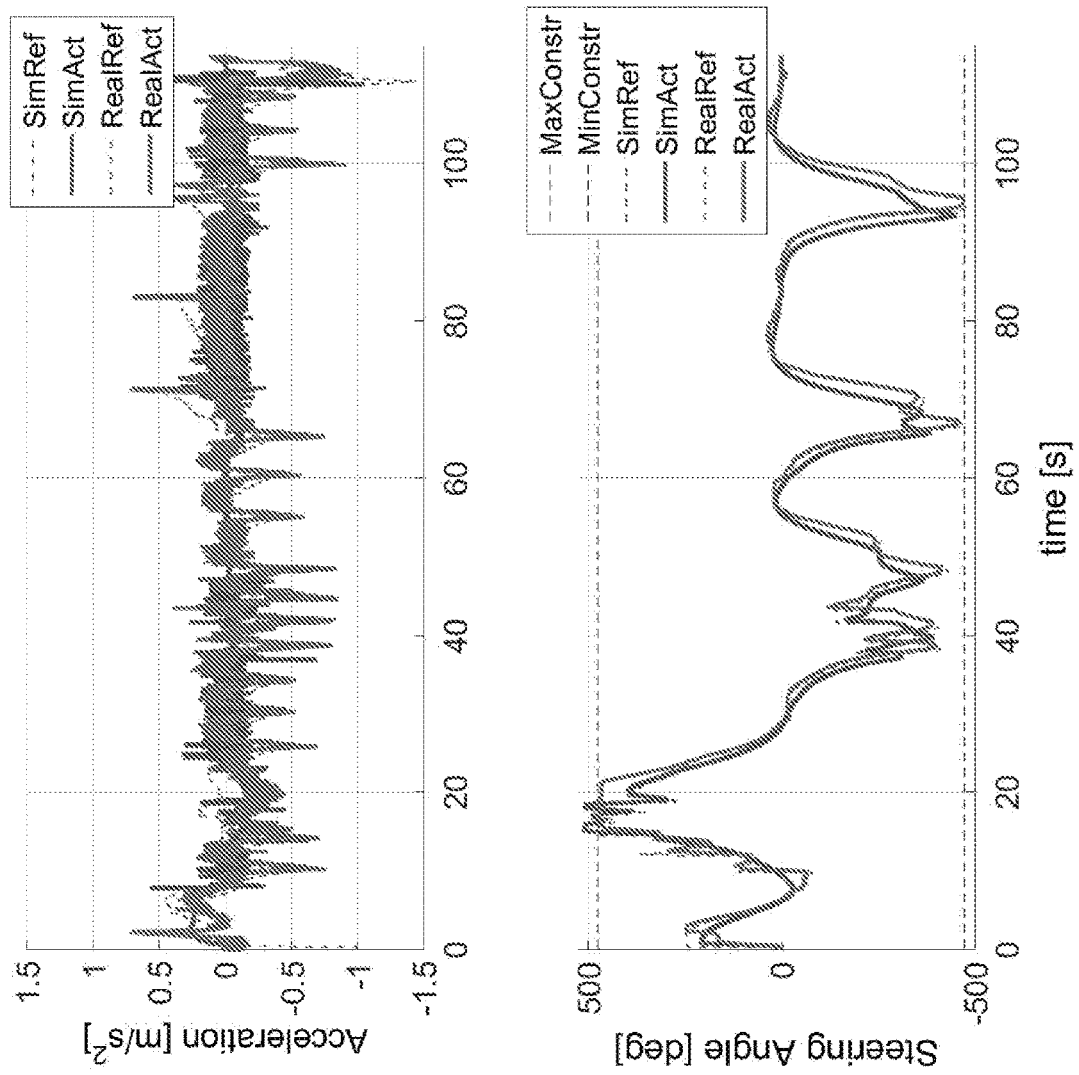
FIG. 12 comparatively shows reference and actuated control inputs during a simulation and a test on road of the second low-speed manoeuvre.

The second low-speed manoeuvre is shown in FIGS. 10, 11, and 12, which correspond to FIGS. 7, 8, and 9 relating to the first low-speed manoeuvre.

Again the matching between simulation and test is impressive in terms of trajectory and bearing. The differences in terms of longitudinal and lateral commands are reasonable. This mismatch is acceptable considering a simulation tool enough complex to represent the vehicle for the model based design, and, at the same time, enough simple to be identified and maintained.

Figure 13:
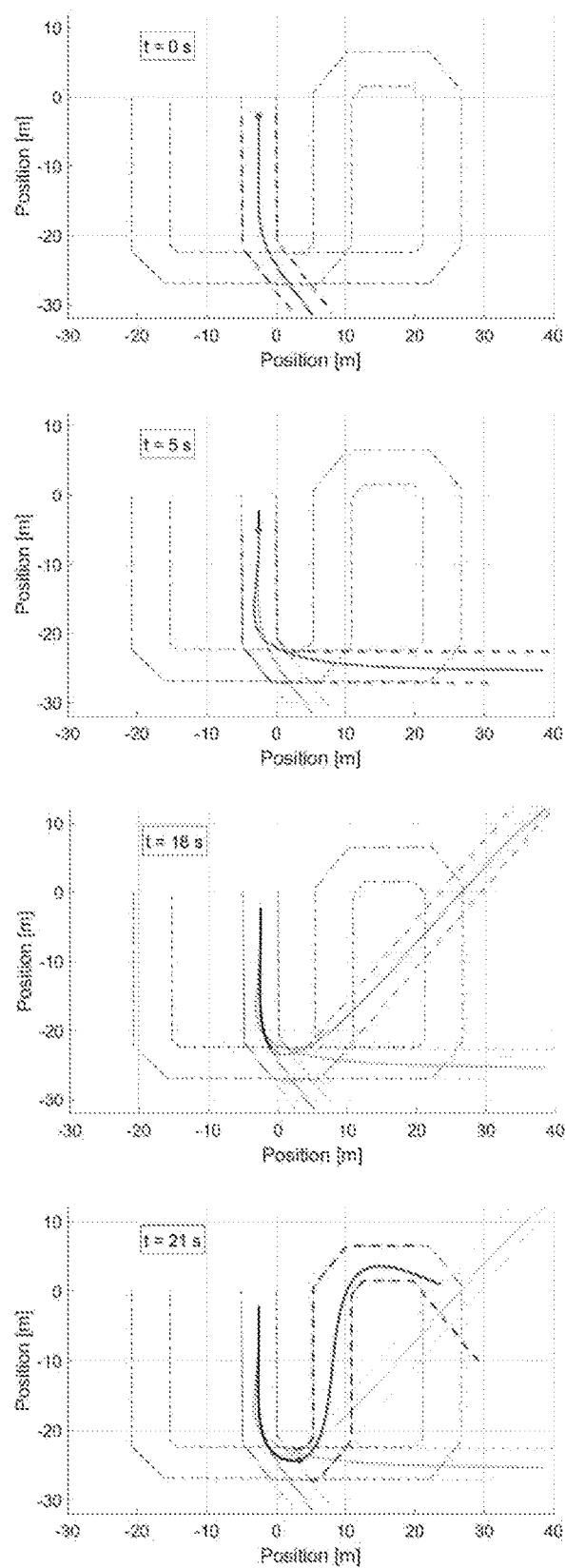
FIG. 13 shows lateral constraints and predicted and travelled trajectories of a motor-vehicle during the second low-speed manoeuvre.

Besides, FIG. 13 shows the sequence of predicted trajectories at different time steps during the second low-speed manoeuvre. The continuous line shows the trajectory travelled by the motor-vehicle, the dotted lines show the planned trajectories at each timestamp, and the dashed lines show the constraints. It's very impressive to see how the planned trajectory tries to track the references and to keep the defined constraints. The sequence of plots shows also how the optimization solvers have to solve a different problem including, step by step, different path segments and different path segment orientations. This demonstrates the effectiveness of explained approach to solve a non-linear optimization problem with a linear approach based on time state control form (TSCF) transformation.

The invention claimed is:

1. An automotive electronic dynamics control system for a motor-vehicle equipped with and automotive automated driving system designed to cause the motor-vehicle to perform low-speed manoeuvres in automated driving;
the automotive automated driving system comprises:
an automotive sensory system designed to sense motor-vehicle-related quantities, and
automotive actuators comprising an Electric Power Steering, a Braking System, and a Powertrain;
the electronic dynamics control system is designed to implement:
a Driving Path Planner designed to:
receive data representative of static obstacles in the surroundings of the motor-vehicle and representing static space constraints to the motion of the motor-vehicle, and
compute, based on the received data, a planned driving path for the motor-vehicle during a low-speed manoeuvre performed in automated driving;
a Model Predictive Control (MPC)-based Trajectory Planner and Controller designed to:
receive from the Driving Path Planner data representative of the planned driving path and from the automotive sensory system data representative of positions and orientations of the motor-vehicle and of dynamic obstacles in the surroundings of the motor-vehicle and representing dynamic space constraints to the motion of the motor-vehicle, and compute, based on the received data, a planned lateral trajectory and a planned longitudinal trajectory for the motor-vehicle during the low-speed manoeuvre performed in automated driving; and a Motion Controller designed to:

receive from the Trajectory Planner and Controller data representative of the planned lateral and longitudinal trajectories, and compute commands for the Electric Power Steering based on the planned lateral trajectory, and for the Braking System and the Powertrain based on the planned longitudinal trajectory;

the Driving Path Planner is designed to compute the planned driving path as an obstacle-free driving corridor within which the motor-vehicle may be driven and made up of a series of driving path segments each with a length and an orientation referenced in an inertial reference frame;

the MPC-based Trajectory Planner and Controller comprises:

an MPC-based Lateral Trajectory Planner and Controller designed to compute the planned lateral trajectory as a series of steering requests (6) referenced in a motor-vehicle reference frame; and an MPC-based Longitudinal Trajectory Planner and Controller designed to compute the planned longitudinal trajectory as a series of longitudinal acceleration requests;

the Lateral Trajectory Planner and Controller is further designed to compute the planned lateral trajectory based on a linearized Model which exhibits a representation singularity whenever the relative orientation of a couple of successive driving path segments of the planned driving path is equal to or higher than a given amount;

the Lateral Trajectory Planner and Controller is further designed to dynamically modify relative orientation ($\theta_{ROT}$) of the motor-vehicle reference frame and the inertial reference frame along the planned driving path so as to result in the relative orientations of all of the couples of successive driving path segments of the planned driving path being lower than the given amount.

2. The automotive electronic dynamics control system of claim 1, wherein the Lateral Trajectory Planner and Controller is further designed to compute the orientation ($\theta_{ROT}$) of the motor-vehicle reference frame relative to the inertial reference frame based on the orientation ($\theta_i$) of the driving path segment currently driven by the motor-vehicle and on the orientation ($\theta_{i+1}$) of the next driving path segment.

3. The automotive electronic dynamics control system of claim 2, wherein the Lateral Trajectory Planner and Controller is further designed to compute the orientation ($\theta_{ROT}$) of the motor-vehicle reference frame relative to the inertial reference frame also based on the orientation ($\theta_{i+2}$) of the second next driving path segment.

4. The automotive electronic dynamics control system of claim 3, wherein the Lateral Trajectory Planner and Controller is further designed to compute the relative orientation of the motor-vehicle reference frame and the inertial reference frame as a linear interpolation of the orientation ($\theta_i$) of the driving path segment currently driven by the motor-vehicle and of the orientations ($\theta_{i+1}$, $\theta_{i+2}$) of the first and next driving path segments.

5. The automotive electronic dynamics control system of claim 4, wherein the Lateral Trajectory Planner and Controller is further designed to compute the relative orientation of the motor-vehicle reference frame and the inertial reference frame as:

$$\theta_{ROT} = W \frac{(\theta_{i+2} - \theta_{i+1})d}{d_{i+1,i}} + \frac{(\theta_{i+1} - \theta_i)d}{d_{i+1,i}} + \theta_i \quad (26)$$

$$d = \sqrt{(x_v - x_i)^2 + (y_v - y_i)^2}$$

$$d_{i+1,i} = \sqrt{(x_{i+1} - x_i)^2 + (y_{i+1} - y_i)^2}$$

where:

$\theta_{ROT}$ is the orientation of the motor-vehicle reference frame relative to the inertial reference frame, $\theta_i$, $\theta_{i+1}$, $\theta_{i+2}$ are the orientations of the driving path segment currently driven by the motor-vehicle, of the first next driving path segment, and of the second next driving path segment in the inertial reference frame, W is a weighting factor, $x_v$, $y_v$ are the current motor-vehicle's coordinates in the inertial reference frame, d is the Euclidean distance between the current position of the motor-vehicle 2 and the end of the driving path segment containing the current position of the motor-vehicle 2, and $d_{i+1,i}$ is the length of the next driving path segment to the one containing the current position of the motor-vehicle 2.

6. An automotive electronic control unit designed to implement the automotive electronic dynamics control system as claimed in claim 1.

7. Software loadable in an automotive electronic control unit and designed to cause, when executed, the automotive electronic control unit to become configured to implement the automotive electronic dynamics control system as claimed in claim 1.

* * * * *